US 12,169,851 B2

(12) United States Patent
Frutschy (10) Patent No.: US 12,169,851 B2
(45) Date of Patent: Dec. 17, 2024

(54) INDUCING ACTIONS IN CONSUMER ENTITIES

(71) Applicant: Coin Mutual Funds LLC, Clifton Park, NY (US)

(72) Inventor: Kristopher John Frutschy, Clifton Park, NY (US)

(73) Assignee: COIN MUTUAL FUNDS, LLC., Griswold, CT (US)

( * ) Notice: Subject to any disclaimer, the term of this patent is extended or adjusted under 35 U.S.C. 154(b) by 333 days.

(21) Appl. No.: 16/435,381

(22) Filed: Jun. 7, 2019

(65) Prior Publication Data
US 2019/0378165 A1    Dec. 12, 2019

Related U.S. Application Data

(60) Provisional application No. 62/683,503, filed on Jun. 11, 2018.

(51) Int. Cl.
*G06Q 30/02* (2023.01)
*G06K 19/06* (2006.01)
(Continued)

(52) U.S. Cl.
CPC .......... *G06Q 30/0254* (2013.01); *G06N 3/08* (2013.01); *G06Q 30/0211* (2013.01); *G06K 19/06037* (2013.01)

(58) Field of Classification Search
CPC ......... G06V 40/23; G06N 3/126; G06N 20/00
See application file for complete search history.

(56) References Cited

U.S. PATENT DOCUMENTS

2008/0154820 A1* 6/2008 Kirshenbaum ........ G06N 3/126
                                                    706/20
2009/0316983 A1* 12/2009 Han ..................... G06V 40/23
                                                    382/159
(Continued)

FOREIGN PATENT DOCUMENTS

CA       3115898 A1 *  4/2019  ......... G06K 9/00201
CA       2556778 C   *  8/2019  ............ G06N 99/00

OTHER PUBLICATIONS

C. Perlich, Machine learning for targeted display advertising: transfer learning in action, p. 105-107 https://link.springer.com/article/10.1007%2Fs10994-013-5375-2 (Year: 2014).*
(Continued)

*Primary Examiner* — Saba Dagnew
(74) *Attorney, Agent, or Firm* — Perkins Coie LLP (57) ABSTRACT

A system is provided for providing action inducers to target consumer entities. The system accesses transactions relating to actions involving a consumer entity and a provider entity. The system generates training data based on the transactions. The training data includes a feature vector for each consumer entity that includes values for features derived from the transactions involving that consumer entity and a provider entity. Each feature vector is labeled with an outcome that indicates whether a previously provided action inducer induced the consumer entity to take an action. The system trains a classifier based on the training data, generates a target feature vector for a target consumer entity, applies the classifier to the target feature vector to generate a predicted outcome for the target action inducer, and when the predicted outcome satisfies an inducement criterion, provides the target action inducer to the target consumer entity.

23 Claims, 6 Drawing Sheets

(51) Int. Cl.
 *G06N 3/08* (2023.01)
 *G06Q 30/0211* (2023.01)
 *G06Q 30/0251* (2023.01)

(56) References Cited

U.S. PATENT DOCUMENTS

| | | | | |
|---|---|---|---|---|
| 2011/0161165 | A1* | 6/2011 | Gierkink | G06Q 30/0246 705/14.45 |
| 2015/0186953 | A1* | 7/2015 | Gross | G06T 1/0007 705/14.58 |
| 2016/0180248 | A1* | 6/2016 | Regan | G09B 5/00 706/12 |
| 2018/0001184 | A1* | 1/2018 | Tran | G06F 1/163 |
| 2018/0089585 | A1* | 3/2018 | Rickard, Jr. | G06N 20/00 |
| 2018/0308133 | A1* | 10/2018 | Geist, Jr | G06Q 30/0271 |

OTHER PUBLICATIONS

AUTHOR(S):Guido, G Title:Target direct marketing Journal:Journal of marketing management [online]. Publication date:Aug. 10, 2011 [retrieved on:May 25, 2022]. Retrieved from the Internet: < URL: https://web.s.ebscohost.com/ehost/pdfviewer/pdfviewer?vid=0&SID=7a8f534b-35de-4f37-bce0-9dcc067de7d6%40redis> (Year: 2011).*

Lee, Yunseong, Title: Learning Prediction serving systems Journal:USENIX. Publication date: 2018.[retrieved on: Dec. 1, 2022 ]. Retrieved from the Internet: < URL: https://www.usenix.org/system/files/osdi18-lee.pdf > hereinafter as LEE (Year: 2018).*

Wang, Donghui . Title: Content Based Recommender Journal: Elsevier. Publication date: 2018. [retrieved on: Dec. 1, 2022 ]. Retrieved from the Internet: < URL: https://www.sciencedirect.com/science/article/pii/S0950705118302107> hereinafter as WANG (Year: 2018).*

He, Xinran, Title: Practical lessons from predictingclicks on ads at facebook Journal:ACM. Publication date: 2014. [retrieved on:Jun. 6, 2023 ]. Retrieved from the Internet: < URL: https://dl.acm.org/doi/pdf/10.1145/2648584.2648589> hereinafter as He (Year: 2014).*

* cited by examiner

INDUCING ACTIONS IN CONSUMER ENTITIES

CROSS-REFERENCE TO RELATED APPLICATION(S)

This application claims the benefit of U.S. Provisional Application No. 62/683,503, filed on Jun. 11, 2018, which is incorporated by reference herein in its entirety.

BACKGROUND

Businesses employ various methods to entice consumers to visit their stores and/or websites such as by distributing discount coupons. Businesses use coupons to encourage consumers to purchase products by creating product awareness, prompting product trials, or rewarding repeat product purchases. Businesses print and distribute hundreds of billions of paper coupons a year. However, the effectiveness of paper coupons has been limited by low redemption rate, high cost of processing, fraud and/or error, lack of information on the person who redeems a coupon. Coupons can also be distributed electronically (e.g., via websites, emails, mobile applications, etc.). Electronic coupons have become popular with the proliferation of mobile communication devices (e.g., smartphones, tablets, etc.). Although electronic coupons are more effective than paper coupons, electronic coupons are still considered to be highly inefficient. For example, the redemption rate for electronic coupons is only about 10%. This is largely because these coupons are mass-marketed coupons that are not tailored to individual consumers' needs and spending habits.

DETAILED DESCRIPTION

A method and a system are provided for providing action inducers to target consumer entities to induce the target consumer entities to interact with provider entities. In some embodiments, an action inducing ("AI") system controls the identifying of action inducers and providing of the identified action inducers to consumer entities to induce a consumer entity to take an induced action. For example, a provider entity may be a publisher of online content and a consumer entity may be a prospective viewer of the online content. If the online content is subscription-based, then an action inducer may be a one-day trial subscription for free or a one-month trial subscription for a reduced subscription fee.

The AI system may access transactions relating to actions that each involves a consumer entity and a provider entity. For example, the transactions may be records of prior interactions of consumer entities with the online content of various provider entities. Some of the accessed transactions may be been induced by previously provided action inducers. For example, when a consumer entity was provided an action inducer for a one-day trial subscription and then signed up for the one-day trial subscription, the transactions of signing up for the trial, viewing the online content, and subsequently signing up for a full subscription are considered to be induced by the action inducer. The AI system may be employed by a provider entity to identify action inducers to consumer entities based on its transactions and transactions of other provider entities if available. The AI system may also be employed by third-party entities (e.g., a bank or a credit card company) to recommend to provider entities action inducers to provide consumer entities based on transactions intermediated by the third-party entity. The third-party entity may provide the recommendations as a service to its customers who are provider entities without charge in hopes of obtaining revenue from intermediating transactions based on the recommendations or may charge a service fee for the recommendations.

In some embodiments, the AI system generates a classifier to suggest action inducers for target consumer entities that are likely to be effective (i.e., inducing the desired action) based on analysis of prior successful action inducers. For example, if a certain type of action inducers were successful with consumer entities who were involved with certain types of transactions, then the classifier may suggest that type of action inducer for other consumer entities involved with similar types of transactions. To generate the classifier, the AI system generates training data based on the transactions. For each consumer entity who has been provided an action inducer, the AI system may generate a feature vector for that consumer entity that includes values for features derived from the transactions involving that consumer entity. For example, the features may include total amount spent viewing online content, amounts spent viewing different types of online content (e.g., sports, financial, and political), location from which different types of online content were accessed, and so on. The AI system may label each feature vector with an outcome related to action inducer provided to that consumer entity. The outcome may indicate whether a previously provided action inducer induced the consumer entity to take the desired action. For example, a label may indicate that a certain action inducer may have had a positive outcome for a consumer entity, but a different action inducer had a negative outcome. The AI system may then employ various machine learning techniques to train the classifier using training data comprising the labeled feature vectors.

In some embodiments, after the classifier is trained, the AI system uses the classifier to recommend target action inducers to target consumer entities. To generate a recommendation, the AI system generates a target feature vector for a target consumer entity. The AI system then applies the classifier to the target feature vector to generate a predicted outcome for the target action inducer. For example, the predicted outcome for a one-day trial for a target consumer entity may be that the probability of being successful is 0.25 and for a one-month trial for that target consumer entity may be that probability of being successful is 0.10. In such case, the provider entity of the online content may decide to send an action inducer based on the one-day trial, because of the higher probability of success. The AI system may also track different types of outcomes for an action inducer such as whether the target consumer entity signs up for the one-day trial and whether the target consumer entity subsequently signs up for an ongoing paid subscription.

In some embodiments, the AI system may be employed to identify effective action inducers for a wide variety of applications. For example, the action inducers may be employed to encourage donations to a cause (e.g., political or religious) by providing certain action inducers such as an offer for a VIP seat at a gathering for the cause. In such a case, the transactions may involve donations by consumer entities to other causes. As another example, the action inducers may be vouchers for a product or service such as a two-for-one voucher, a percent off voucher, and so on. The transactions may be the financial transactions recorded based on various electronic payment methods such a debit card, credit card, cryptocurrency payment, and so on. The AI system may employ various techniques to ensure the anonymity of consumer entities. For example, the owner of a coffee shop may not know the identity of consumer entities to whom action inducers have been sent until a consumer entity takes an action based on the action inducers. Indeed, depending on the form of payment, the consumer entities may be entirely anonymous.

In some embodiments, the AI system tracks when action inducers result in a positive outcome. After identifying a target consumer entity, the AI system may send a text message or email message to the target consumer entity that includes a quick response ("QR") code that identifies the target action inducer and the target provider entity. The action inducer may be a 50% voucher for the purchase of a drink at a coffee shop. When the target consumer entity provides the QR code to the target provider entity, the AI system reads the QR code and records a transaction indicating that the outcome was successful. To prevent a consumer entity from being inundated with action inducers, the AI system may allow consumer entities to establish inducement criteria for receiving action inducers. For example, an inducement criterion may that the action inducer needs to be at least a 50% off voucher or that no more than 10 action inducers a month are to be provided to the consumer entity. The AI system also allows a provider entity to establish inducement criteria. For example, a coffee shop may specify that action inducers should only be provided to consumer entities who frequent coffee shops within three blocks of that given coffee shop or spend more than $100 per month at coffee shops or fast-food restaurants.

In some embodiments, the AI system may access transactions and record transactions in a distributed ledger. For example, when consumer entities interact with provider entities transactions may be stored in a shared distributed ledger. The AI system may store a transaction in the distributed ledger for each action inducer that is issued to a consumer entity. When the consumer entity takes an induced action (e.g., as evidenced by scanning a QR code or transfer of a digital token on a distributed ledger), then the AI system may record another transaction in the distributed ledger. The distributed ledger may be a blockchain or non-blockchain distributed ledger.

The bitcoin system is an example of a distributed ledger. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins. Other blockchains have be developed to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private key pair. The owner public key or hash of the owner public key is set as the token owner identity, and when performing actions against tokens, ownership proof is established by providing a signature generated by the owner private key and validated against the public key or hash of the public key listed as the owner of the token. A person can be uniquely identified, for example, using a combination of a user name, social security number, and biometric (e.g., fingerprint). The creation of an identity token for an asset in a blockchain establishes provenance of the asset, and the identity token can be used in transactions (e.g., buying, selling, insuring) involving the asset stored in a blockchain, creating a full audit trail of the transactions.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account or a cryptocurrency digital wallet). The computer code ensures that all the terms of the contract are complied with before the transaction is recorded in the blockchain.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to mine new blocks and maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

The classifier may be any of a variety or combination of classifiers including neural networks such as fully-connected, convolutional, recurrent, autoencoder, or restricted Boltzmann machine, a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

In some embodiments, the AI system may use various design-of-experiments ("DOE") techniques to identify values of feature vectors of consumer entities that result in positive outcomes for various action inducers. Suitable DOE techniques include central composite techniques, Box-Behnken techniques, random techniques, Plackett-Burman techniques, Taguchi techniques, Halton, Faure, and Sobel sequences techniques, Latin hypercube techniques, and so on. (See Cavazzuti, M., "Optimization Methods: From Theory to Design," Springer-Verlag Berlin Heidelberg, 2013, chap. 2, pp. 13-56, which is hereby incorporated by reference.) The Latin hypercube technique has the characteristic that it generates sample values in which each axis (i.e., feature) has at most value that is selected.

Figure 1:
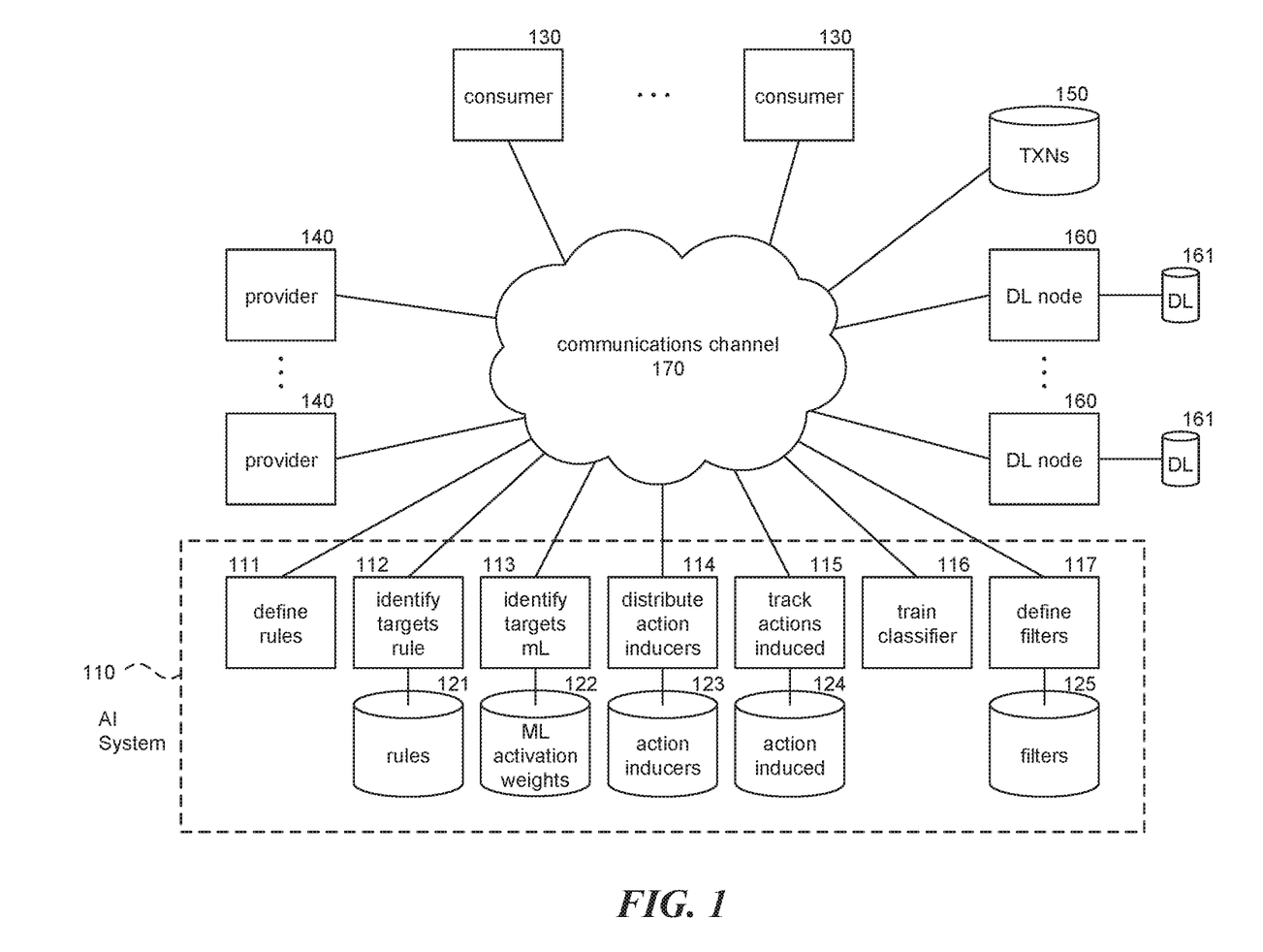
FIG. 1 is a block diagram that illustrates components of an AI system and related systems in some embodiments.

FIG. 1 is a block diagram that illustrates components of the AI system and related systems in some embodiments. The AI system 110 includes a define rules component 111, an identify targets based on rule component 112, and identify targets based on machine learning component 113, a distribute action inducers component 114, a track actions induced component 115, a train classifier component 116, and define filters component 117. The AI system also includes a rules storage 121, a machine learning activation weights storage 122, an action inducers storage 123, an action induced storage 124, and a filter storage 125. The AI system interfaces with consumer computing systems 130, provider computing systems 140, transactions (TXNs) storage 150, and distributed ledger nodes 160 with distributed ledger storages 161 via communications channel 170.

The define rules component allows a provider entity to define various rules for identifying and distributing action inducers. The define rules component may provide a user interface through which a provider entity can define conditions that when satisfied enable various types of action inducers. Alternatively, or in addition, the define rules component may allow the provider entity to designate a function or module that is invoked to apply a rule to a consumer entity. The rules are stored in the rules storage. The identify targets based on rule component identifies target consumer entities for target action inducers provided by a provider entity based on the rules specified by that provider entity and stores an indication of the target action inducers mapped to the target consumer entities in the action inducers storage. The train classifier component is invoked to train a classifier and stores the learned activation weights in the machine learning activation weights storage. The identify targets based on machine learning component is invoked to identify target consumer entities for target action inducers provided by a provider entity based on various machine learning techniques, such as one based on the machine learning activation weights, and stores the target action inducers mapped to the target consumer entities in the action inducers storage. The distribute action inducers component controls the distribution of action inducers to consumer entities such as by text message, electronic mail message, social media posting, blockchain, and so forth. The track actions induced component is invoked when an induced action is detected and stores an indication of the actions that are induced in the action induced storage. The define filters component allows a consumer entity or a provider entity to define various filters such as a consumer entity to define filters for action inducers and provider entities or a provider entity to define filters for consumer entities.

The consumer computing systems may implement a portion of the AI system. For example, the consumer computing systems may execute a consumer application that accesses the action inducers storage periodically to retrieve action inducers for a consumer entity and to provide the action inducers to the consumer entity. The provider computing systems may execute a provider application that allows providers to define rules, establish filters, specify criteria for action inducers, and so on. The transactions storage may be records of purchase transactions between consumer entities and provider entities. The distributed ledger nodes implement a distributed ledger with a copy stored on each distributor ledger storage. The various storages of the AI system and the transaction storage may also be stored on the distributed ledger or a different distributed ledger. The communications channel may be the Internet.

The computing systems on which the AI system may be implemented may include a central processing unit, input devices, output devices (e.g., display devices and speakers), storage devices (e.g., memory, disk drives, and cloud storage), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the AI system. The data transmission media are used for transmitting data via transitory, propagating signals or carrier waves (e.g., electromagnetism) via a wired or wireless connection.

The AI system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the AI system may be implemented in hardware using, for example, an application-specific integrated circuit (ASIC).

The AI system may employ various techniques to speed up the process of identifying target consumer entities and distributing action inducers. For example, the AI system may schedule a separate thread of execution for each consumer entity to identify action inducers for that consumer entity. Also, the AI system may direct each provider computing system to perform the processing to identify the consumer entities for its action inducer, which may be performed with anonymized identities of the consumer entities. Some of the components of the AI system may be implemented as smart contracts on the distributed ledger. For example, the AI system may record a transaction for each provider entity with a smart contract for identifying target consumer entities for that provider entity. The AI system may support representing action inducers as tokens stored in the distributed ledger. To provide an action inducer for a consumer entity, the AI system issues an action inducer token to the address (e.g., hash of the public key) of the consumer entity. The fees charged by the distributed ledger system for recording a transaction (e.g., gas) may serve as an incentive for a provider entity to send action inducers to only those consumer entities who are likely to take the induced action. Smart contract can be programmed to expire if not used by a certain date, thus minimizing financial exposure of the target provider entity. The AI system may also support storing records of transactions between consumer entities and provider entities in the distributed ledger. The AI system may also store demographic information (e.g., sex and age) or other feature vector information about consumer entities in the distributed ledger or a sidechain. The demographic information can be used as features in the machine learning or in the rules.

Figure 2:
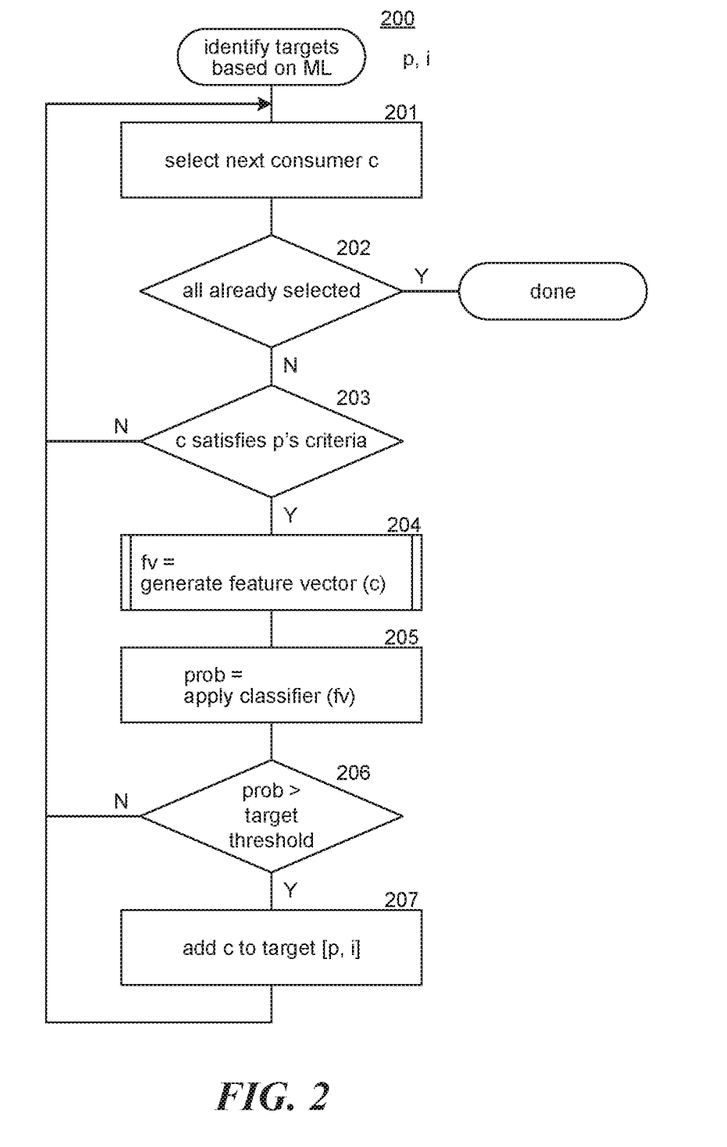
FIG. 2 is a flow diagram that illustrates the processing of an identify targets using machine learning component of the AI system in some embodiments.

FIG. 2 is a flow diagram that illustrates the processing of an identify targets using machine learning (ML) component of the AI system in some embodiments. The identify targets using machine learning component 200 is invoked passing an indication of a provider entity (p) and an action inducer (i), identifies the consumer entities to which the action inducer is to be applied, and adds the identified consumer entities to a list of target consumer entities for the action inducer. In block 201, the component selects the next consumer entity. In decision block 202, if all the consumer entities have already been selected, then the component completes, else the component continues at block 203. In decision block 203, if the consumer entity satisfies the criteria specified by the provider entity, then the component continues at block 204, else the component loops to block 201 to select the next consumer entity. A criterion may be, for example, that the consumer entity spends at least $50 a month on a certain type of purchases. In block 204, the component generates a feature vector (fv) based on the data of the consumer entity. In block 205, the component applies the classifier for the action inducer to the feature vector to identify a probability associated with the action inducer inducing the selected consumer entity to take the induced action. In decision block 206, if the probability is above a target threshold probability specified by the provider entity, then the component continues at block 207, else the component loops to block 201 to select the next consumer entity. In block 207, the component adds the consumer entity to be a target consumer entity for the action inducer and then loops to block 201 to select the next consumer entity.

Figure 3:
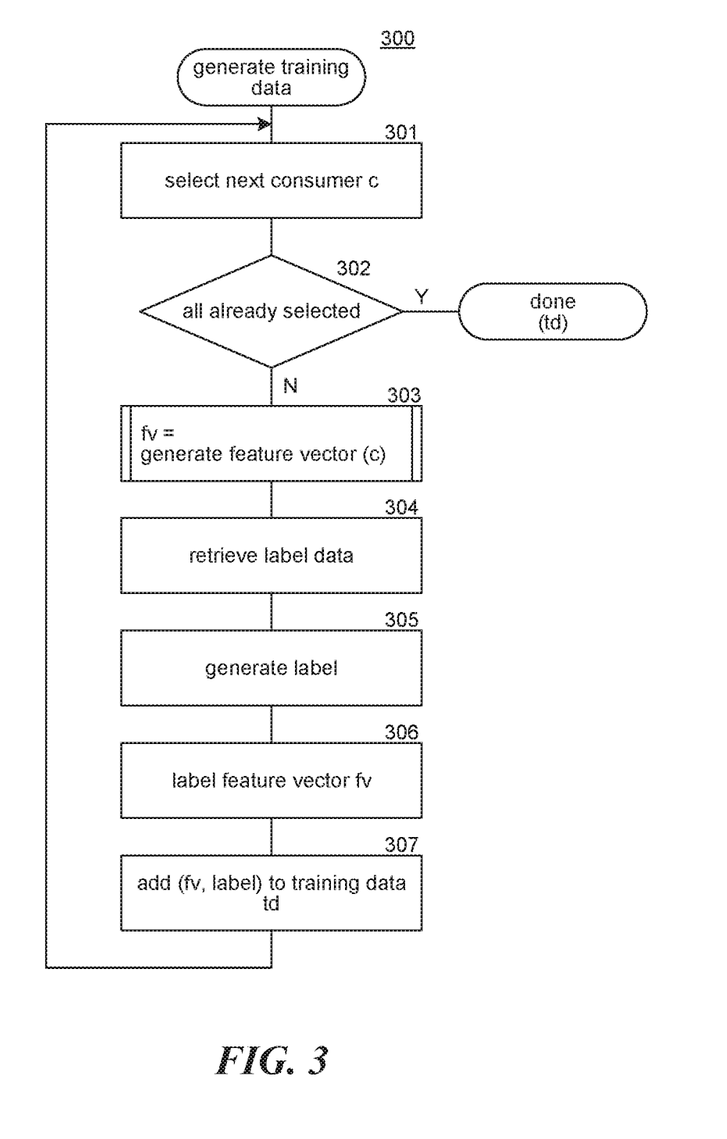
FIG. 3 is a flow diagram that illustrates the processing of a generate training data component of the AI system in some embodiments.

FIG. 3 is a flow diagram that illustrates the processing of a generate training data component of the AI system in some embodiments. The generate training data component 300 is invoked to generate the training data for training a classifier using the train classifier component. In block 301, the component selects the next consumer entity. In decision block 302, if all the consumer entities have already been selected, then the component completes indicating the training data, else the component continues at block 303. In block 303, the component invokes the generate feature vector component passing an indication of the consumer entity to generate a feature vector for the consumer entity. In block 304, the component retrieves data for generating a label for the feature vector. In block 305, the component generates a label based on the retrieved label data. In block 306, the component labels the feature vector. In block 307, the component adds the feature vector with the label to the training data and then loops to block 301 to select the next consumer entity.

Figure 4:
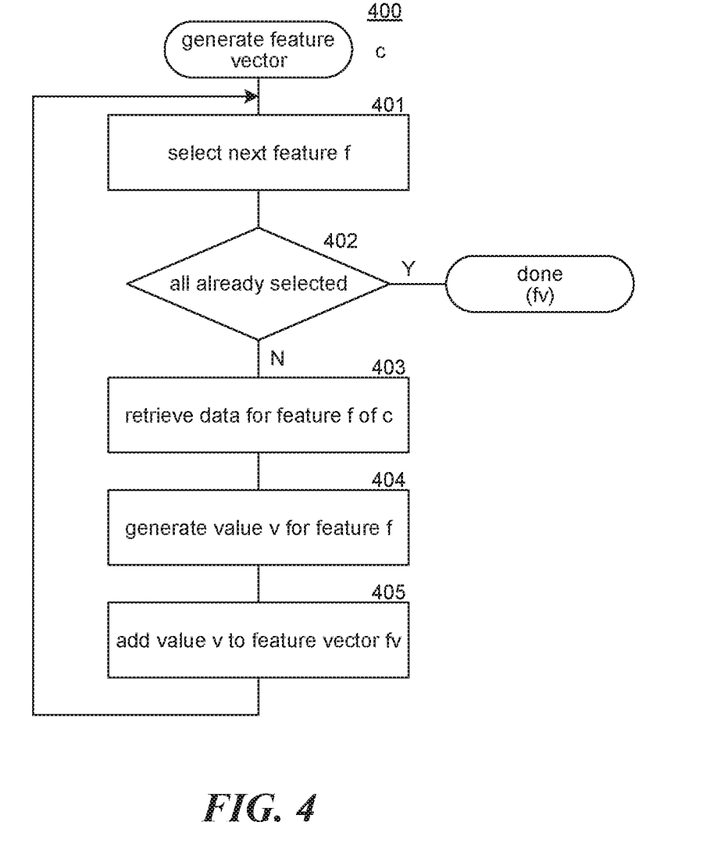
FIG. 4 is a flow diagram that illustrates the processing of a generate feature vector component of the AI system in some embodiments.

FIG. 4 is a flow diagram that illustrates the processing of a generate feature vector component of the AI system in some embodiments. The generate feature vector component 400 is invoked passing an indication of a consumer entity (c) and generates a feature vector for the consumer entity based on the data relating to the consumer entity. In block 401, the component selects the next feature of the feature vector. In decision block 402, if all the features have already been selected, then the component completes indicating the feature vector, else the component continues at block 403. In block 403, the component retrieves the data for the selected feature for the consumer entity. In block 404, the component generates a value for the selected feature based on the data. In block 405, the component adds the value to the feature vector and loops to block 401 to select the next feature.

Figure 5:
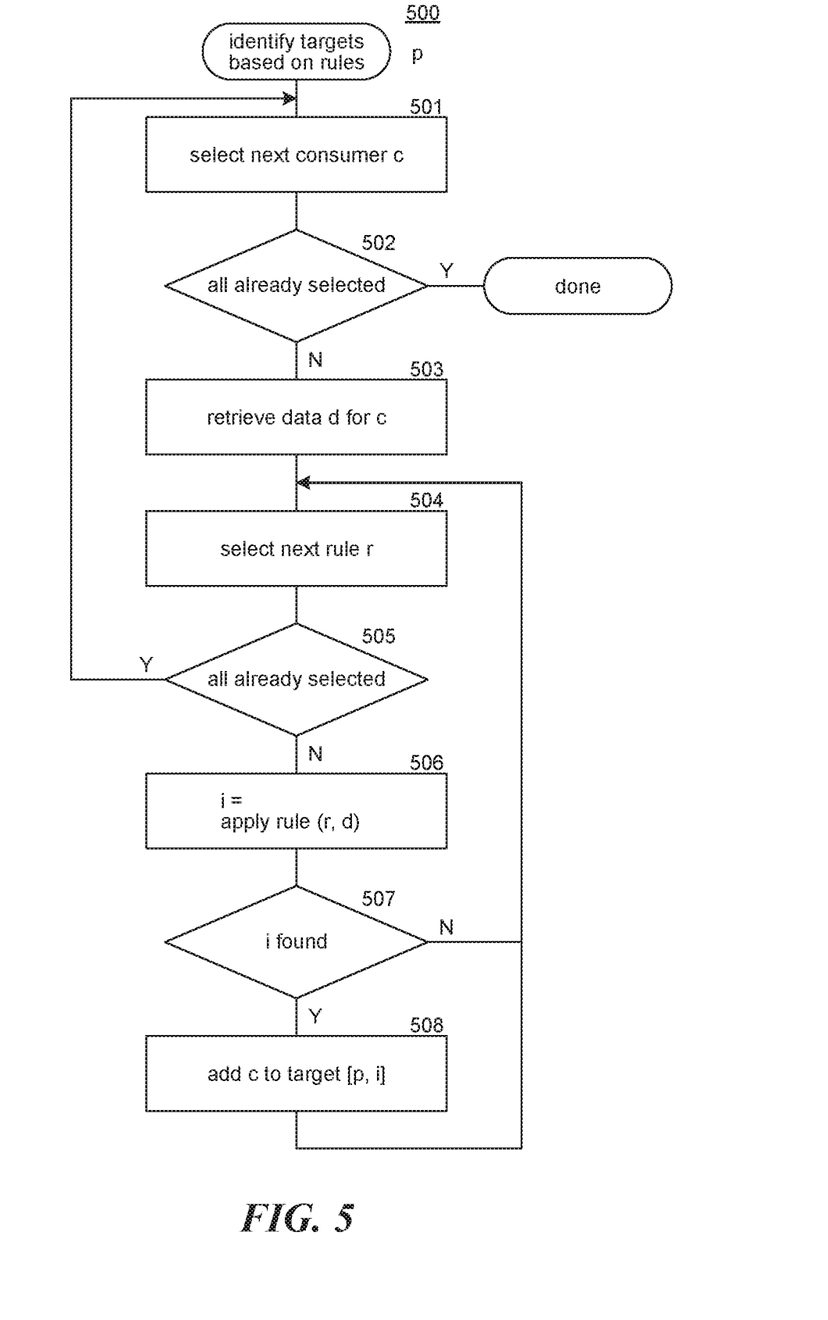
FIG. 5 is a flow diagram that illustrates the processing of an identify targets based on rule component of the AI system in some embodiments.

FIG. 5 is a flow diagram that illustrates the processing of an identify targets based on rule component of the AI system in some embodiments. The identify targets based on rule component is invoked passing an indication of a provider entity (p), identifies target consumer entities for target action inducers provided by the provider entity based on the rules established by the provider entity, and adds the target consumer entities to a list of target consumer entities for the target action inducers. In block 501, the component selects the next consumer entity. In decision block 502, if all the consumer entities have already been selected, then the component completes, else the component continues at block 503. In block 503, the component retrieves the data for the selected consumer entity. In block 504, the component selects the next rule of the provider entity. In decision block 505, if all the rules of the provider entity have already been selected for the selected consumer entity, then the component loops to block 501 to select the next consumer entity, else the component continues at block 506. In block 506, the component applies the rule to the data for the consumer entity to identify action inducers (i) that satisfy the rule. In decision block 507, if such action inducers are found, then the component continues at block 508, else the component loops to block 504 to select the next rule. In block 508, the component adds the selected consumer entity to the list of target consumer entities for the identified action inducers of the provider entity and loops to block 504 to select the next rule. In some embodiments, the component may create a separate thread of execution for a consumer entity to apply the rules to that consumer entity so that the applying of the rules can be performed in parallel.

Figure 6:
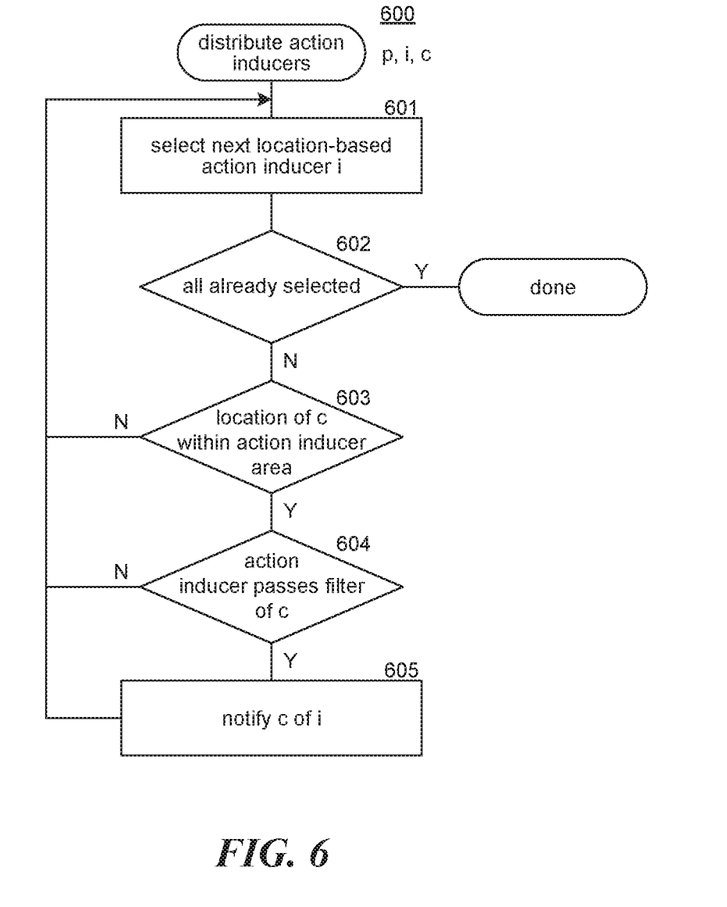
FIG. 6 is a flow diagram that illustrates the processing of a distribute action inducers component of the AI system in some embodiments.

FIG. 6 is a flow diagram that illustrates the processing of a distribute action inducers component of the AI system in some embodiments. The distribute action inducers component 600 is invoked passing an indication of a provider entity (p), action inducers (i), and consumer entities (c) to which the action inducers are to be applied, and distributes the action inducers based on location of the consumer entities. For example, if a consumer entity is near a coffee shop, then an action inducer related to that coffee shop may be distributed to the consumer entity. The component may execute on a consumer computing system, a provider computing system, the AI system, and so on. In block 601, the component selects the next action inducer. In decision block 602, if all the location-based action inducers have already been selected, then the component completes, else the component continues at block 603. In decision block 603, if the location of the consumer entity is within an area established for the action inducer, then the component continues at block 604, else the component loops to block 601 to select the next location-based action inducer. In decision block 604, if the action inducer passes the filter specified by the consumer entity, then the component continues at block 605, else the component loops to block 601 to select the next location-based action inducer. In block 605, the component notifies the consumer of the action inducer and then loops to block 601 to select the next location-based action inducer.

The following paragraphs describe various embodiments of aspects of the AI system. An implementation of the AI system may employ any combination of the embodiments. The processing described below may be performed by a computing system with a processor that executes computer-executable instructions stored on a computer-readable storage medium that implements the AI system.

In some embodiments, a method is provided for providing action inducers to target consumer entities. The method accesses transactions relating to actions involving a consumer entity and a provider entity. At least some of the transactions are based on a previously provided action inducers. The method generates training data based on the transactions. The training data includes for a plurality of consumer entities a feature vector for that entity that includes values for features derived from the transactions involving that consumer entity and a provider entity. Each feature vector is labeled with an outcome related to a target action inducer. The outcome indicates whether a previously provided action inducer induced the consumer entity to take an action. The method trains a classifier based on the training data. The classifier inputs a feature vector and outputs a predicted outcome. The method generates a target feature vector for a target consumer entity. The method applies the classifier to the target feature vector to generate a predicted outcome for the target action inducer. When the predicted outcome satisfies an inducement criterion, the method provides the target action inducer to the target consumer entity.

In some embodiments, the providing of the target action inducer includes generating a quick response code for identifying the target action inducer to a target provider entity. In some embodiments, the inducement criterion is established by the target consumer entity. In some embodiments, the inducement criterion relates to number of action inducers that the target consumer entity has received. In some embodiments, the inducement criterion relates to value of the target action inducer. In some embodiments, the inducement criterion is established by a target provider entity associated with the target action inducer. In some embodiments, the inducement criterion relates to current location of the target consumer entity. In some embodiments, the method receives an indication when the target action inducer has induced the target consumer entity to take an action based on the action inducer. In some embodiments, the classifier is applied to multiple target consumer entities and when applying the classifier, the method schedules a separate thread of execution for each target consumer entity to apply the classifier to that target consumer entity. In some embodiments, the transactions are stored in a distributed ledger. In some embodiments, the applying of the classifier is performed on a computing device of the target consumer entity. In some embodiments, the action inducer provides a pecuniary inducement. In some embodiments, the pecuniary inducement includes a cryptocurrency inducement. In some embodiments, the provider entity performs the training, generating, applying, and providing. In some embodiments, a third-party entity performs the training, generating, applying, and providing. In some embodiments, a third-party entity performs the training, and the provider entity performs the generating, applying, and providing. In some embodiments, a third-party entity performs the training, generating, and applying, and the provider entity performs the providing.

In some embodiments, one or more computing systems for providing action inducers to target consumer entities are provided. The one or more computing systems include one or more computer-readable storage mediums storing computer-executable instructions and one or more processors for executing the computer-executable instructions stored in the one or more computer-readable storage mediums. The instructions, when executed, control the one or more computing systems to access transactions relating to actions involving a consumer entity and a provider entity. At least some of the transactions are based on a previously provided action inducers. The instructions control the one or more computing systems to generate training data based on the transactions. The training data includes for a plurality of consumer entities a feature vector for that entity that includes values for features derived from the transactions involving that consumer entity and a provider entity. Each feature vector is labeled with an outcome related to target action inducer. The outcome indicates whether a previously provided action inducer induced the consumer entity to take an action. The instructions control the one or more computing systems to train a classifier based on the training data. The classifier inputs a feature vector and outputs a predicted outcome. The instructions control the one or more computing systems to generate a target feature vector for a target consumer entity, apply the classifier to the target feature vector to generate a predicted outcome for the target action inducer, and when the predicted outcome satisfies an inducement criterion, provide the target action inducer to the target consumer entity.

In some embodiments, the instructions further control the one or more computing systems to receive an indication when the target action inducer has induced the target consumer entity to take an action based on the action inducer. In some embodiments, the classifier is applied to multiple target consumer entities and the instructions further control the one or more computing systems to when applying the classifier, schedule a separate thread of execution for each target consumer entity to apply the classifier to that target consumer entity. In some embodiments, the transactions are stored in a distributed ledger using smart contracts.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for providing action inducers to target consumer entities, the method comprising:
   accessing historical transaction data samples relating to actions involving a plurality of consumer entities and a provider entity, each historical transaction data sample comprising:
   (i) an interactive action involving a respective consumer entity of the plurality of consumer entities and the provider entity, and
   (ii) a corresponding previously provided action inducer that induced the respective consumer entity to take the interactive action,
       wherein the previously provided action inducer is at least one of (a) a coupon, (b) a trial subscription, or (c) a voucher;
   generating training data based on the historical transaction data samples, each training data sample comprising:
   (i) a feature vector based on at least one historical data sample, the feature vector comprising values derived from:
       (a) the interactive action involving the respective consumer entity and the respective provider entity, and
       (b) the corresponding previously provided action inducer, and
   (ii) an outcome label for the feature vector indicating whether the previously provided action inducer was successful in inducing the respective consumer entity to take the interactive action;
   training a classifier using the generated training data that includes samples of the feature vectors and the outcome labels,
       wherein the classifier receives the feature vectors as input and outputs a predicted outcome label;
   determining whether the training of the classifier causes an error rate associated with the training of the classifier to fail to satisfy an error rate condition;
   in response to the error rate failing to satisfy the error rate condition, retraining the classifier on a subset of the training data including the feature vectors labeled with the outcome respective to the previously provided action inducer, to cause an updated error rate associated with the retraining of the classifier to satisfy the error rate condition;
   generating a first target feature vector for a target consumer entity representing a first target action inducer for the target consumer entity,
       wherein the first target action inducer is at least one of (a) a second coupon, (b) a second trial subscription, or (c) a second voucher;
   applying the retrained classifier on the generated first target feature vector to generate a first predicted outcome of success for the first target action inducer indicating that the first target action inducer will induce the target consumer entity to take a target interactive action; and when the first predicted outcome of success for the first target action inducer satisfies an inducement criterion, providing the first target action inducer to the target consumer entity.

2. The method of claim 1, wherein the providing of the first target action inducer includes generating a quick response code for identifying the first target action inducer to a target provider entity.

3. The method of claim 1, wherein the inducement criterion relates to at least two of: a number of action inducers that the target consumer entity has received and redeemed, a value of the first target action inducer, or a current location of the target consumer entity.

4. The method of claim 1, further comprising:
receiving an indication when the first target action inducer has induced the target consumer entity to take the action.

5. The method of claim 1, wherein generating the first predicted outcome of success for the first target action inducer, by the applying the retrained classifier on the generated first target feature vector, is performed on a mobile computing device of the target consumer entity.

6. The method of claim 1, wherein the first target action inducer provides a pecuniary inducement.

7. The method of claim 1, wherein a third-party entity performs the training, retraining, generating of the first target feature vector, generating of the first predicted outcome of success, and providing.

8. One or more computing systems for providing action inducers to target consumer entities, the one or more computing systems comprising:
one or more computer-readable storage mediums storing computer-executable instructions for controlling the one or more computing systems to:
access historical transaction data samples relating to actions involving a plurality of consumer entities and a provider entity, each historical transaction data sample comprising:
(i) an interactive action involving a respective consumer entity of the plurality of consumer entities and the provider entity, and
(ii) a corresponding previously provided action inducer that induced the respective consumer entity to take the interactive action,
wherein the previously provided action inducer is at least one of (a) a coupon, (b) a trial subscription, or (c) a voucher;
generate training data based on the historical transaction data samples, each training data sample comprising:
(i) a feature vector based on at least one historical data sample, the feature vector comprising values derived from:
(a) the interactive action involving the respective consumer entity and the respective provider entity, and
(b) the corresponding previously provided action inducer, and
(ii) an outcome label for the feature vector indicating whether the previously provided action inducer was successful in inducing the respective consumer entity to take the interactive action;
train a classifier using the generated training data that includes samples of the feature vectors and the outcome labels,
wherein the classifier receives the feature vectors as input and outputs a predicted outcome label;
determine whether the training of the classifier causes an error rate associated with the training of the classifier to fail to satisfy an error rate condition;
in response to the error rate failing to satisfy the error rate condition, retraining the classifier on a subset of the training data including the feature vectors labeled with the outcome respective to the previously provided action inducer to cause an updated error rate associated with the retraining of the classifier to satisfy the error rate condition;
generate a first target feature vector for a target consumer entity representing a first target action inducer for the target consumer entity, wherein the first target action inducer is at least one of (a) a second coupon, (b) a second trial subscription, or (c) a second voucher;
apply the retrained classifier on the generated first target feature vector to generate a first predicted outcome of success for the first target action inducer indicating that the first target action inducer will induce the target consumer entity to take a target interactive action; and
when the first predicted outcome of success for the first target action inducer satisfies an inducement criterion, provide the first target action inducer to the target consumer entity; and
one or more processors for executing the computer-executable instructions stored in the one or more computer-readable storage mediums.

9. The one or more computing systems of claim 8, wherein the computer-executable instructions further control the one or more computing systems to receive an indication when the target action inducer has induced the target consumer entity to take the action based on the action inducer.

10. The one or more computing systems of claim 8, wherein the transactions are stored and executed in a distributed ledger using smart contracts.

11. The method of claim 1, wherein the classifier is a neural network and wherein the classifier is trained by employing one or more machine learning techniques comprising producing a set of weights for activation functions of the neural network.

12. The method of claim 1, wherein at least one feature vector is labeled to indicate that a given previously provided action inducer had a positive outcome for a given consumer entity, and wherein at least one feature vector is labeled to indicate that a given previously provided action inducer had a negative outcome for a given consumer entity.

13. The method of claim 1, further comprising:
generating a second target feature vector for each target consumer entity of multiple target consumer entities;
scheduling a separate thread of execution for each generated second target feature vector; and
applying the retrained classifier on the generated second target feature vector of each generated first target feature vector to generate a second predicted outcome of success for a second target action inducer of each generated second target feature vector, at the respective separate thread of execution.

14. The one or more computing systems of claim 8, wherein the computer-executable instructions further control the one or more computing systems to:
generating a second target feature vector for each target consumer entity of multiple target consumer entities;
scheduling a separate thread of execution for each generated second target feature vector; and
apply the retrained classifier on the generated second target feature vector of each generated first target feature vector to generate a second predicted outcome of success for a second target action inducer of each generated second target feature vector, at the respective separate thread of execution.

15. The method of claim 1, further comprising:
responsive to receiving an indication of the first target action inducer successfully inducing the target consumer entity to take the target interactive action, adding the first target feature vector and a positive outcome label to the training data.

16. The method of claim 1, further comprising:
accessing a first inducement criterion, selected by the target consumer entity, for filtering valid action inducers that are viewable by the target consumer entity;
accessing a second inducement criterion, selected by a target provider entity associated with the first target action inducer, for filtering valid action inducers provided by the target provider entity; and
determining the first target action inducer satisfies both the first and the second inducement criterion.

17. The method of claim 1, further comprising:
responsive to receiving an indication of the first target action inducer successfully inducing the target consumer entity to take the target interactive action, adding a transaction record comprising (i) the target interactive action and (ii) the target action inducer to the historical transaction data samples stored on a distributed ledger.

18. The method of claim 1, wherein the values of the feature vector comprise a total amount spent viewing online content, an amount spent viewing different types of online content, a location from which different types of online content were accessed, or a combination thereof.

19. The method of claim 1, further comprising:
generating a second target feature vector for the target consumer entity representing a second target action inducer for the target consumer entity;
applying the retrained classifier on the generated second target feature vector to generate a second predicted outcome of success for the second target action inducer indicating that the second target action inducer will induce the target consumer entity to take the target interactive action;
determining a recommended target action inducer between the first and the second target action inducer based on a comparison between the first and the second predicted outcomes of success; and
providing the recommended target action inducer to the target consumer entity.

20. The method of claim 1, further comprising:
identifying, from the historical transaction data samples, a second target action inducer corresponding to the target interactive action;
generating a second target feature vector for the target consumer entity representing the second target action inducer for the target consumer entity; and
applying the retrained classifier on the generated second target feature vector to generate a second predicted outcome of success for the second target action inducer indicating that the second target action inducer will induce the target consumer entity to take the target interactive action.

21. The method of claim 1, further comprising:
identifying, from the historical transaction data samples, a second target action inducer associated with the target consumer entity;
generating a second target feature vector for the target consumer entity representing the second target action inducer for the target consumer entity; and
applying the retrained classifier on the generated second target feature vector to generate a second predicted outcome of success for the second target action inducer indicating that the second target action inducer will induce the target consumer entity to take the target interactive action.

22. The method of claim 1, further comprising:
displaying, at a user interface accessible by the respective provider entity for the target interactive action, a set of inducement criteria applicable to the first target action inducer;
receiving, at the user interface, a provider selection of at least one inducement criterion from the set of inducement criteria; and
determining whether the first target action inducer satisfies the at least one provider selected inducement criterion.

23. The method of claim 1, wherein applying the retrained classifier on the generated first target feature vector to generate the first predicted outcome of success is performed when duration since generation of a prior predicted outcome of success satisfies a periodic threshold.

* * * * *